(12) United States Patent
Hallam-Baker

(10) Patent No.: US 9,083,695 B2
(45) Date of Patent: *Jul. 14, 2015

(54) CONTROL AND MANAGEMENT OF ELECTRONIC MESSAGING

(71) Applicant: Verisign, Inc., Reston, VA (US)

(72) Inventor: Phillip Martin Hallam-Baker, Medford, MA (US)

(73) Assignee: VERISIGN, INC., Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/276,085

(22) Filed: May 13, 2014

(65) Prior Publication Data
US 2014/0250506 A1 Sep. 4, 2014

Related U.S. Application Data

(60) Continuation of application No. 13/350,620, filed on Jan. 13, 2012, now Pat. No. 8,745,146, which is a continuation of application No. 12/692,430, filed on Jan. 22, 2010, now Pat. No. 8,103,732, which is a division of application No. 10/395,238, filed on Mar. 25, 2003, now Pat. No. 7,676,546.

(51) Int. Cl.
*H04L 12/58* (2006.01)
*H04L 29/06* (2006.01)

(52) U.S. Cl.
CPC ............. *H04L 63/08* (2013.01); *H04L 12/585* (2013.01); *H04L 51/12* (2013.01); *H04L 65/1079* (2013.01)

(58) Field of Classification Search
CPC ..... H04L 51/12; H04L 63/08; H04L 63/0428; H04L 63/061; H04L 12/58; H04L 12/585; H04L 2453/101; H04L 9/3263; H04W 12/06; G06F 12/1406; G06F 21/31; G06F 21/33; G06F 21/86
USPC ............ 709/206, 207, 236, 245; 726/5, 12, 2; 370/389; 713/153, 170, 194, 176; 719/315

See application file for complete search history.

(56) References Cited

U.S. PATENT DOCUMENTS

| | | | |
|---|---|---|---|
| 6,044,260 A | 3/2000 | Eaton et al. | |
| 6,240,091 B1 * | 5/2001 | Ginzboorg et al. | ............ 370/401 |
| 6,460,050 B1 | 10/2002 | Pace et al. | |
| 6,487,586 B2 | 11/2002 | Ogilvie et al. | |
| 6,748,422 B2 | 6/2004 | Morin et al. | |
| 6,826,618 B2 | 11/2004 | Morris et al. | |
| 6,996,225 B1 | 2/2006 | Bordonaro et al. | |
| 7,089,241 B1 | 8/2006 | Alspector et al. | |
| 7,103,599 B2 | 9/2006 | Buford et al. | |
| 7,149,778 B1 | 12/2006 | Patel et al. | |
| 7,174,368 B2 | 2/2007 | Ross, Jr. | |
| 7,216,227 B2 | 5/2007 | Gynberg | |
| 7,222,157 B1 | 5/2007 | Sutton et al. | |
| 7,249,175 B1 | 7/2007 | Donaldson | |
| 7,290,035 B2 | 10/2007 | Mattathill | |
| 7,293,063 B1 | 11/2007 | Sobel | |

(Continued)

*Primary Examiner* — Alina N Boutah
(74) *Attorney, Agent, or Firm* — MH2 Technology Law Group, LLP

(57) ABSTRACT

A method for controlling a message from a sender. A referee can evaluate a credential associated with a message to determine its desirability to the intended recipient, and take an action based upon the results of the determination. A sender that includes a trusted component can send a credential with the message, and the message can be controlled without a referee.

36 Claims, 2 Drawing Sheets

(56) References Cited

U.S. PATENT DOCUMENTS

| | | |
|---|---|---|
| 7,293,065 B2 | 11/2007 | Banister et al. |
| 7,293,171 B2 | 11/2007 | Batthish et al. |
| 7,299,261 B1 | 11/2007 | Oliver et al. |
| 7,359,948 B2 | 4/2008 | Ralston et al. |
| 7,380,126 B2 | 5/2008 | Logan et al. |
| 7,398,315 B2 | 7/2008 | Atkinson et al. |
| 7,406,506 B1 | 7/2008 | Sutton, Jr. et al. |
| 7,472,163 B1 | 12/2008 | Ben-Yoseph et al. |
| 7,543,053 B2 | 6/2009 | Goodman et al. |
| 7,676,546 B2 | 3/2010 | Hallam-Baker |
| 7,779,080 B2 | 8/2010 | Pang |
| 7,801,960 B2 | 9/2010 | Hockey |
| 8,140,703 B2 | 3/2012 | Morris et al. |
| 2001/0049745 A1 | 12/2001 | Schoeffer |
| 2002/0026487 A1 | 2/2002 | Ogilvie et al. |
| 2002/0029248 A1 | 3/2002 | Cook et al. |
| 2002/0046243 A1 | 4/2002 | Morris et al. |
| 2002/0052919 A1 | 5/2002 | Morris et al. |
| 2002/0091777 A1 | 7/2002 | Schwartz |
| 2002/0120600 A1 | 8/2002 | Schiavone et al. |
| 2002/0181703 A1 | 12/2002 | Logan et al. |
| 2003/0041126 A1 | 2/2003 | Buford et al. |
| 2003/0135573 A1 | 7/2003 | Taylor |
| 2003/0158960 A1 | 8/2003 | Engberg |
| 2003/0200334 A1 | 10/2003 | Grynbert |
| 2004/0024823 A1 | 2/2004 | Del Monte |
| 2004/0024824 A1 | 2/2004 | Fergusson et al. |
| 2004/0030918 A1 | 2/2004 | Karamchedu et al. |
| 2004/0068542 A1 | 4/2004 | Lalonde et al. |
| 2004/0073617 A1 | 4/2004 | Miliken et al. |
| 2004/0111480 A1 | 6/2004 | Yue |
| 2004/0148356 A1 | 7/2004 | Bishop et al. |
| 2004/0177120 A1 | 9/2004 | Kirsch |
| 2006/0075048 A1 | 4/2006 | Gruper et al. |
| 2007/0038718 A1 | 2/2007 | Khoo et al. |
| 2007/0174402 A1 | 7/2007 | Tomkow |
| 2008/0147808 A1 | 6/2008 | Pang |

* cited by examiner

CONTROL AND MANAGEMENT OF ELECTRONIC MESSAGING

CROSS REFERENCE TO RELATED APPLICATIONS

This application is a continuation of U.S. patent application Ser. No. 13/350,620, filed on Jan. 13, 2012, which is a continuation of U.S. patent application Ser. No. 12/692,430, filed on Jan. 22, 2010, now U.S. Pat. No. 8,103,732 issued on Jan. 24, 2012, which is a divisional of patent application Ser. No. 10/395,238, filed on Mar. 25, 2003, now U.S. Pat. No. 7,676,546 issued on Mar. 9, 2010, all which are hereby incorporated by reference in their entirety.

FIELD

The field of the invention is electronic messaging, and in particular the control and management of electronic messaging.

BACKGROUND

The popularity of electronic messaging such as e-mail is being marred by ever increasing amount of unsolicited messages (commonly known as "spam") that is received by users. Spam can waste users' time, can clog users' electronic storage devices, and its sheer volume can make it difficult for a user to identify messages that the user wants to receive. In the process of deleting spam, a user can inadvertently delete wanted messages. Spam can contain advertisements (e.g., such as Unsolicited Commercial E-Mail ("UCE"); deceptive and/or unlawful offers; viruses; spyware; offensive content; and other undesirable forms of information. Vast numbers of spam messages can be sent for little or no cost to their sender ("spammer"), who can take various actions to hide his true identity. For example, spammers often forge the source address of the e-mails that they send. Spam can be received in practically any medium, including e-mail, instant messaging, telephonically, etc. Practically any arena in which a party may initiate an unsolicited communication may be exploited by spammers. For example, automated and live unsolicited telephone calls is a well known technology exploited by certain spammers telemarketers.)

Legislative measures for controlling spam have largely been stymied by constitutional concerns relating to freedom of speech. Further, it can be as easy to send spam from abroad as from a jurisdiction in which spam is controlled by law.

Blacklisting e-mails with various predetermined characteristics (e.g., from a given address, containing certain keywords, etc.) has been less than totally effective because spammers have learned to change the content and source addresses to circumvent blacklists. Further, a blacklist can also inadvertently stop wanted messages from being seen by a user, which is undesirable.

A new solution is needed to accurately and effectively solve the problems caused by spam.

BRIEF DESCRIPTION OF THE DRAWINGS

The accompanying drawings, which are incorporated in and constitute a part of this specification, illustrate embodiments of the disclosure and together with the description, serve to explain the principles of the disclosure. In the figures.

DETAILED DESCRIPTION OF THE EMBODIMENTS

Figure 1:
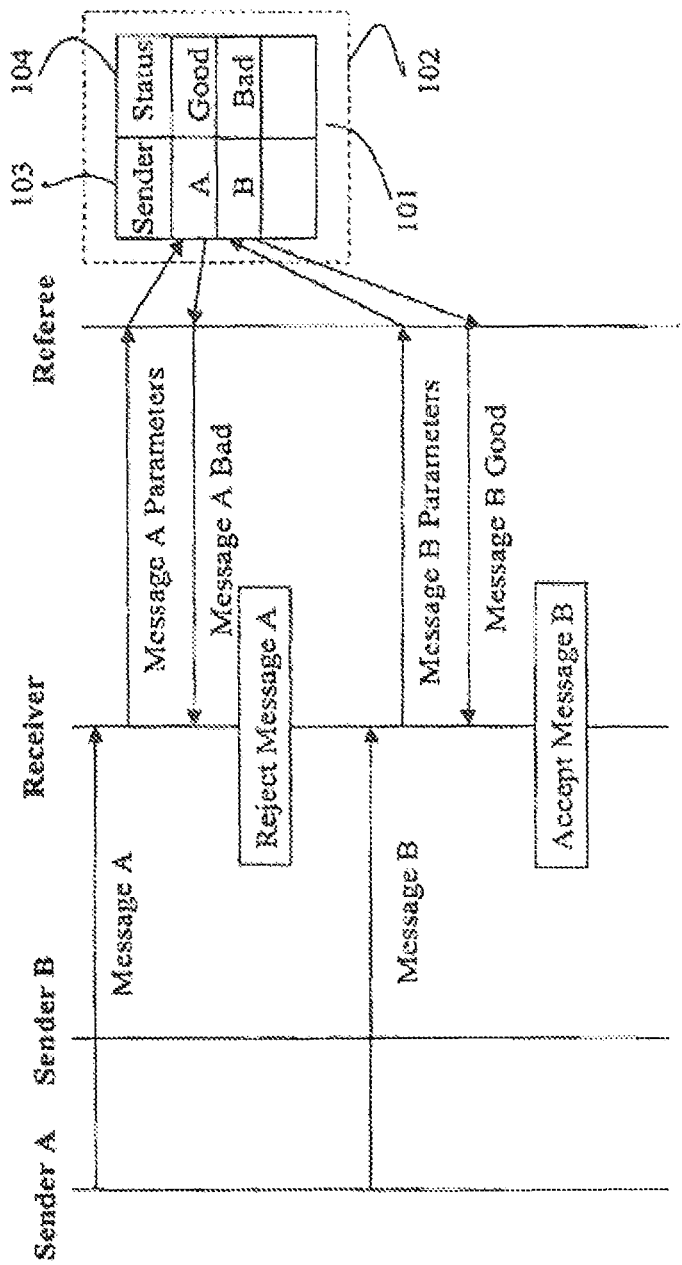
FIG. 1 is a message flow diagram in accordance with an embodiment of the present invention.

In one embodiment of the present invention, a referee is used to discriminate desirable from undesirable messages. An example of this embodiment involving e-mail messages is shown in FIG. 1, which depicts several e-mail senders 101, several e-mail recipients 102 and a referee 103. The present invention is equally applicable to any other kind of message, such as telephone messages, unwanted advertisements in television signals, etc. A sender can associate a credential (e.g., a digital signature, a digital certificate, etc.) with a message. A credential is a statement whose authenticity can be verified, and that is resistant to unauthorized modification, its integrity has not been compromised. For example, the statements "The sender of this e-mail is Joseph Smith, 100 ABC Way, Sometown, N.Y. 14593" and "The sender of this e-mail has sent 3,562 e-mails in the past hour." can be hashed (e.g., using the MD5 algorithm), and the resulting hash can be signed by the sender's private key. The sender's corresponding public key can be signed by a Certification Authority (a trusted third party), in this example, a credential can include, among other things, the statements (which may or may not be encrypted); the sender's public key; and the Certification Authority's signature of the sender's public key. A recipient can verify the authenticity and integrity of the credential by verifying the sender's public key by consulting the Certification Authority, and then verifying the statements using the sender's verified public key, wishing to verify the statements using the Certification Authority's own private key. The foregoing is meant only to illustrate, and not to limit, the contents of a credential. Other ways of forming credentials are known, e.g., using symmetric keys rather than public/private key pairs.

A credential can be used by a referee to evaluate the desirability of the message. For example, the sender can include a digital signature with the message, along with the sender's certificate. The digital signature and certificate can be used by the referee to authenticate the message. This can advantageously detect messages that are purportedly sent from a first party, while actually having been sent from a second. For example, this can detect a false source address in an e-mail message.

The referee can store records in a database that correlates different certificates with various desirability levels. For example, a given certificate may be correlated with an opt-in subscription by a given user, and have a high desirability rating for that user. Alternatively, the certificate may be correlated with a known spammer, and have a low desirability rating. In either case, the referee can take an action with respect to the message based upon the results of the referee's authentication of the message and/or evaluation of the credential. For example, the referee can simply pass on a message that has been evaluated as desirable to the intended recipient. The referee can block (not forward) a message with a low desirability evaluation. A message can be "blocked" by taking an action that prevents its being considered by the intended recipient. And for intermediate ratings, the referee can associate a warning (or some other desirability indicator or rating) with the message that conveys valuable information about the desirability of the message.

Desirability information can be sent to the intended recipient, to some other entity responsible for filtering the message, such as a firewall, or to any other appropriate party. For example, the warning can indicate that the message is likely to be spam. The rating (indicator) can be a numerical rating, e.g., from 0 (least desirable) to 10 most desirable). The indicator can be a flag set to 1 if the message is determined to be spam, and 0 if it is not. The warning, indicator or rating can be sent with the message, before the message is sent, or after the message is sent. In this way, the intended recipient may be able to opt to have the referee or another intermediary (e.g., a firewall) forward or block the message. The message can also be filed in given folder or marked with a different sensitivity indicator (e.g., a rating, highlighted, etc.) if it is suspected to be spam.

A message between the referee and the recipient can also be authenticated. For example, a message from a referee contains message content and a authentication including a digital signature based upon the referee's private key. A digital signature (by the sender, referee, etc) can be composed by performing a hash function on the message content and then encrypting the resulting hash with the appropriate private key. Likewise, a Message Authentication Code (MAC) can be computed for the message. For a signature, when a recipient wishes to be assured that the message was in fact sent by the referee, the recipient can obtain the referee's certificate and verify the signature. The recipient can also verify the MAC. This assures the recipient that the message is indeed from the referee, and in this example, that the message contents have not been tampered with en route between the referee and the recipient.

Key distribution in accordance with an embodiment of the present invention can be handled using a Public Key Infrastructure such as X.509/PKIX, in which certificates are issued by a certification authority, by an online key management mechanism such as XKMS, or by other means known in the art. Any suitable method or methods of authentication can be used. Another example of authentication includes a credential that includes biometric information (e.g., retina scan data; fingerprint data; iris scan data; etc.) of the sender and/or a trusted third party. Other authentication methods are known in the art and can be used to authenticate a message sent from the sender, recipient or referee.

The referee can associate a status (e.g., desirability status or rating) with respect to at least some of the senders. For example, a credential, a sender address and/or some other attribute of an e-mail identified as spam can be associated with a "good" status or "bad" status. The status can also be derived from information obtained from one or more third parties. For example, a receiver that has identified an e-mail as spam can forward the e-mail to the referee, who can then log the sender's credential, the source address, the destination address, subject fine, keywords in the body of message, and/or other attributes, etc. as associated with "bad" e-mail, i.e., spam. Likewise, a receiver can send a copy of a legitimate, non-spam e-mail to the referee, who may log one or more of its attributes as associated with "good" e-mail, i.e., not spam. A given good or bad status may apply generally, e.g., to all receivers. A given good or bad status may be applied to a specific receiver or group of receivers. In this way, a referee can advantageously accommodate situations in which an e-mail message that is spam to a first receiver and not spam to a second receiver may have a "good" status with respect the first receiver, and a "bad" status with respect to the second receiver. This same technique can be applied to other types of messages, such as telephone calls. A credential such as a digital signature and/or certificate can be transmitted from a caller to a called party as part of the telephone call, or as switching information that pertains to the call. The referee can be at a switch that handles the call. Likewise, a credential can be associated with a telephone call by a trusted component at a switch that handles the call.

Likewise, a status can be associated with other parameters, besides a particular receiver or group of receivers. For example, a given source address may be legitimate if sent during certain hours or on certain days, and illegitimate otherwise. For example, the customer service department of a national retailer may only send out messages during normal business hours. A spammer may spoof the retailer's address as the source address of e-mail that is sent outside of normal business hours. In another example, an e-mail for a given source address may only be legitimate when associated with certain keywords in the body of the e-mail message. The referee may develop a status rule that assigns a "good" status to an e-mail message from a given sender if the appropriate keywords are also present in the body of the message. In another example, the referee can determine the number of other complaints received about the e-mail. If the number of complaints exceeds a threshold, the message can be classified as "bad". As shown by these examples, the referee can develop sophisticated e-mail status determination rules that accurately classify e-mail as good or bad. These rules can be associated with a credential that can be included in the messages, and used to evaluate the desirability of the messages.

The receiver or referee can receive e-mail that either has, or does not have, a credential, such as a digital signature, certificate, etc, if the e-mail has a credential, then the recipient (e.g., the receiver or referee) can use the credential to determine the desirability of the message, e.g., to verify the sender of the message, to verify that the content of the message has not been altered without authorization since the it was generated; etc. E-mail that has credential can be treated differently than that which does not. For example, the presence or absence of a credential can be a factor for determining if the e-mail is good or bad. If a credential does not verify properly, then the message can be classified as "bad". A message may have more than one credential.

There can be multiple referees in accordance with the present invention. A receiver can choose which referee to consult to determine if a message such as an e-mail is good or bad. Different referees can specialize in different types of messages (e.g., commercial, private, e-mail with attachments, e-mail without attachments, etc.); employ different message status determination rules; apply different levels of strictness in evaluating messages; etc.

A referee can issue a warning to a sender when an e-mail from the sender has been identified as "bad"; when a complaint against the sender has been received; etc. A process can be established for rehabilitating an e-mail, a sender, etc. For example, a sender that has received a complaint can send a message explaining the purpose of the e-mail to the referee, who can then decide to establish or change the status of the e-mail, sender, etc., in question.

Complaints can also be evaluated by the referee using the same or other criteria as is used to determine the status of e-mail. For example, an unusual volume of complaints from a single source may render those complaints suspect. Indeed, the complaints themselves can be rated by the referee, and used accordingly.

The standing status of a sender may be communicated and responded to in many ways. For example, the referee can issue a Certificate Revocation list that revokes the digital certificate of the sender's signing key if the sender has a "bad" status. The referee can issue a limited-use token (e.g., limited number of messages; limited time period, etc.) to the sender that establishes that the sender is currently in good standing. Other certificate status notification mechanisms such as Online Certificate Status Protocol (OCSP), XML Key Management Specification (XKMS), etc. can also be used. In these ways, the referee can act effectively to facilitate the control of messages originating from the sender.

The receiver can obtain the standing status of the sender by querying the referee periodically (e.g., for updates to a locally stored database of status information) or each time a message is received. The status query can be relayed through a local intermediary that maintains at least a partial copy of the referee's standing records.

The status can also be stored in a distributed database. For example, status information can be stored in the Domain Name System ("DNS") directly in DNS records, or in a separate repository linked to the DNS by any suitable mechanism, such as NAPTR and SRV. The DNS can be queried based upon, for example, the sender address in the e-mail message at question. In this sense, a message status rating or message desirability rating can be "resolved" based upon a credential of the sender, just as a domain name can be resolved into an IP address. DNS records can be secured using DNSSEC.

A message flow diagram in accordance with an embodiment of the present invention is shown in FIG. 1. Sender A and Sender B send messages to a Receiver. A Referee stores a table 101 in a database 102 that correlates the message sender's address 103 with the status of the message 104, i.e., good or bad. When the Receiver receives Message A from Sender A, the Receiver sends message parameters (e.g., a credential from the sender, the sender's address, the subject line, the body, the entire message, etc.) to the Referee. The Referee queries the database and learns that the message is likely to be bad. The Referee returns this result to the Receiver, who rejects the message. Likewise, Sender B sends Message B to the Receiver, who sends Message B parameters to the Referee. The Referee queries the database 102 and learns that the message is likely to be good, and returns this result to the Receiver, which accepts Message B. In another embodiment, the Referee acts as a messaging proxy for the Receiver; messages to the Receiver are sent through the Referee. The Referee evaluates the message and takes an action with respect to the message, e.g., blocks the message, forwards the message to the Receiver; sends a warning to the Receiver; sends a desirability rating to the Receiver, etc.

In yet another embodiment of the present invention, a message sender class for opt-in advertising can be defined. The referee can verify that a message such as an e-mail that is sent under and opt-in this class is genuinely opt-in by requiring the opt-in process to be auditable in some fashion. For example, the referee verifies that the opt-in messages are signed by means of a digital signature using a given private key. Likewise, different classes of message sender can be established with different acceptable message criteria. For example corporations might opt for a special class that could only be used to send messages containing invoices and account status information.

Thus, examples of sender classes can include:

1) Ordinary user (e.g., expected to send no more than 50 messages per hour);

2) E-commerce server (e.g., sends invoices and receipts in bulk to many subscribers/customers; may send tens of thousands of messages per hour; and should or must normally have a preexisting relationship with each recipient;

3) Opt-in advertiser (e.g., can send advertisements that can be labeled as such, such as Acme Airlines E-fares, Latest Offer from XYZ.com, etc.;

4) Spammers; etc.

The sender classes can be implemented by issuing certificates to senders that identify each sender as belonging to one or more classes. For example, the Acme company could promise to use its e-commerce certificate only for sending account information to frequent flyer members, and to use its opt-in advertising certificate only to send advertisements to its opt-in subscribers, etc. Compliance with these agreements can be audited by a referee. If a sender violated its agreement and, say, used an e-commerce certificate to send advertisement messages, the referee could revoke the sender's certificate(s), e.g., through a Certificate Revocation List. Other penalties could be negotiated in advance by contract between the referee and the company.

The user can filter its e-mail according to the certificate class. For example, all opt-in advertisement e-mails could be directed to be stored in one folder, while e-commerce messages with account information could be directed to another.

The filtering rules can be empirical and auditable, so that the actions of the referee can be subject to scrutiny. This can provide for external checks that advantageously distinguish an embodiment of the present invention over blacklist schemes.

These embodiments are applicable to any form of electronic message, including instant messaging, telephony, video conferencing, etc. For example, the present invention can be implemented for a telephonic message, which includes a telephone call as well as a messages used to set up a telephone call, e.g., in the SS7 system, a PBX, etc. Further, more sophisticated rating systems can be used than establishing a good or bad status for one or more given message parameters. For example, e-mail status determination rules (rating rules) can produce a numerical measure that is assigned to a given e-mail message. For example, a rating between 0 (most likely spam) and 10 (least likely spam) can be assigned to an e-mail message. The message can then be handled in accordance with various thresholds. For example, a user can specify that it wants to see e-mails with status ratings greater than 5.0; another user may specify that it wants to see e-mails with status ratings greater than 8.5 and that are sent from a first given class of sender (e.g., from any sender at xyz.com) and greater than 1.0 that are sent from a second given class of sender (e.g., from any sender at mycompany.com).

In another embodiment of the present invention, e-mail is managed without the use of an external referee. For example, a monitor agent in a trusted component (e.g., a processor or coprocessor and/or software (e.g., firmware)) of a computer that sends messages such as e-mail can include content in a message (e.g., by modifying the credential) to indicate the velocity at which messages are being (or have recently been) sent by the sender. A trusted component is hardware and/or software that is tamper resistant. Email sending velocity can be the number of e-mails sent divided by the amount of time over which the e-mails are sent. A high velocity may indicate a spammer, while a low velocity may indicate a legitimate sender. Information about the velocity with which messages are being sent can be incorporated into or otherwise associated in a trusted way with a certificate by the agent in the trusted component.

In yet another embodiment, telephone spam can also be managed. In one embodiment of the present invention, authentication can be bound to a telephone device, such as a telephone switch, a sending telephone, a receiving telephone, etc. For example, a caller can send an authenticated signal indicating that the call is not spam, without revealing the caller's telephone number. Likewise, a caller (or switch) can send a velocity indicator to a called party (or third party). A high velocity indicator can indicate a greater likelihood that the call is spam.

Messages can be authenticated using a private key that is used to create a digital signature. The trusted component can be configured so that the private key can only be read by a trusted application, such as an authentication agent and/or a message control agent. The message control agent can include a complete e-mail application. It can also be a trusted component that is invoked by an untrusted application.

For example, a message control agent can update a trusted (tamper-resistant) record that indicates the rate at which signatures have been created. The credential of a message controlled by the control agent can include a trusted velocity indicator, a marker that indicates the rate at which signatures were being created at the time the credential was generated. The trusted component can ensure that only the appropriate entity (e.g., the message control agent) can read the private key used to generate the credential, or modify the velocity record data. Each time the message control agent creates a signature containing a trusted velocity record indicator, it can update the velocity record.

A receiver can use the trusted velocity indicator that it receives with e-mails to sort the e-mail. Messages whose velocity indicator shows that the sender recently sent a very high volume of e-mail may be considered suspect. For example a velocity indicator that indicated the sender had sent 10,000 e-mails in the past hour can be rejected. For example, it is unlikely that a sender who is not a spammer would send more than a few tens of messages an hour.

Any suitable velocity indicator may be used. It can be easy to calculate, require a minimal amount of storage, and provide an indication of the velocity with which messages are sent in a way that most appropriately meets the requirements of each situation. For example, the number of time queries could be tracked for each successive predetermined period of time, and the average number of messages sent within, the last time period could be computed. This can also be compared with the average number of messages sent for one or more of the preceding time periods. This comparison can give a sense of the message acceleration, i.e., change in velocity, over time. A high acceleration can indicate a sudden transmission of a large number of messages, which could indicate a spammer.

An adjustable time decay parameter can be built into the velocity indicator to change its sensitivity to the rate at which messages are being sent. For example, a counter-like parameter $c'$ can be calculated to be $$c' = c + e^{-(p/(t'-t))},$$

where
  $t'$=current time
  $c$=last recorded count
  $t'-t$=the time interval between the sending of successive messages
  $p$=adjustable velocity sensitivity parameter When p is smaller than the number of seconds between the sending of subsequent messages, $c'$ is incremented less than one. When p is much larger than the time between messages, then $c'$ is incremented a value about equal to one. In other words, the value of a successive message arrival exponentially decreases over time. For example, if p is set to two seconds and the next message is sent an hour (($t'-t$)=3600 seconds) after the last, then $c'$ will be approximately equal to c. On the other hand, if p is set to one day (p=86,4100) and a message is sent one minute after the last (($t'-t$)=60 seconds), then $c'$ will be approximately equal to c+1. The parameter p can be heuristically likened to the size of the time period of interest. The foregoing examples show that in relation to a period of interest equal to two seconds, a message that is sent an hour after the last was sent is not particularly interesting, i.e., $c'$ is about equal to c. For a period of interest equal to one day, a message sent one minute after the last increments the counter by a value of 1. The counter $c'$ can be used as a sort of velocity indicator by dividing $c'$ by the amount of time since $c'$ has been counting messages, or by any other suitable measure of time (e.g., ($c'-c$)/($t'-t$)). Likewise, the counter $c'$ may be used as a sort of velocity indicator itself.

The trusted message control agent can apply limits on the rate at which a sender can create e-mails. For example, the message control agent can allow a sender to create signatures at a very high rate but only for a short period of time. This can allow a sender to occasionally send out invitations to a meeting with a large number of attendees without being identified as an spammer. Likewise, this would prevent the sender from sending significant volumes of spam. Limits that can be placed on the sender can be stored as a trusted velocity control record, e.g., by the trusted message control agent. For example, two velocity control records can be applied that have time decay constants of 1 hour and 1 day, with thresholds set to allow a sender to issue up to 500 messages in an hour but not to exceed that threshold more than an average of 2 times a day.

An embodiment of the present invention can be deployed on any configuration of hardware and software that includes a trusted component. For example, the trusted component can safeguard the confidentiality of the private key used to generate a credential for sent messages, and control its use. The trusted component can be implemented as trusted hardware/firmware and a trusted operating system such as that proposed by the trusted Computing Alliance and the Microsoft Palladium project. Alternatively, signing functions can be performed by an auxiliary processor providing some degree of tamper resistance such as a smartcard, a USB-based token or any trusted peripheral, such as a trusted cable modem, gateway, switch or router.

Figure 2:
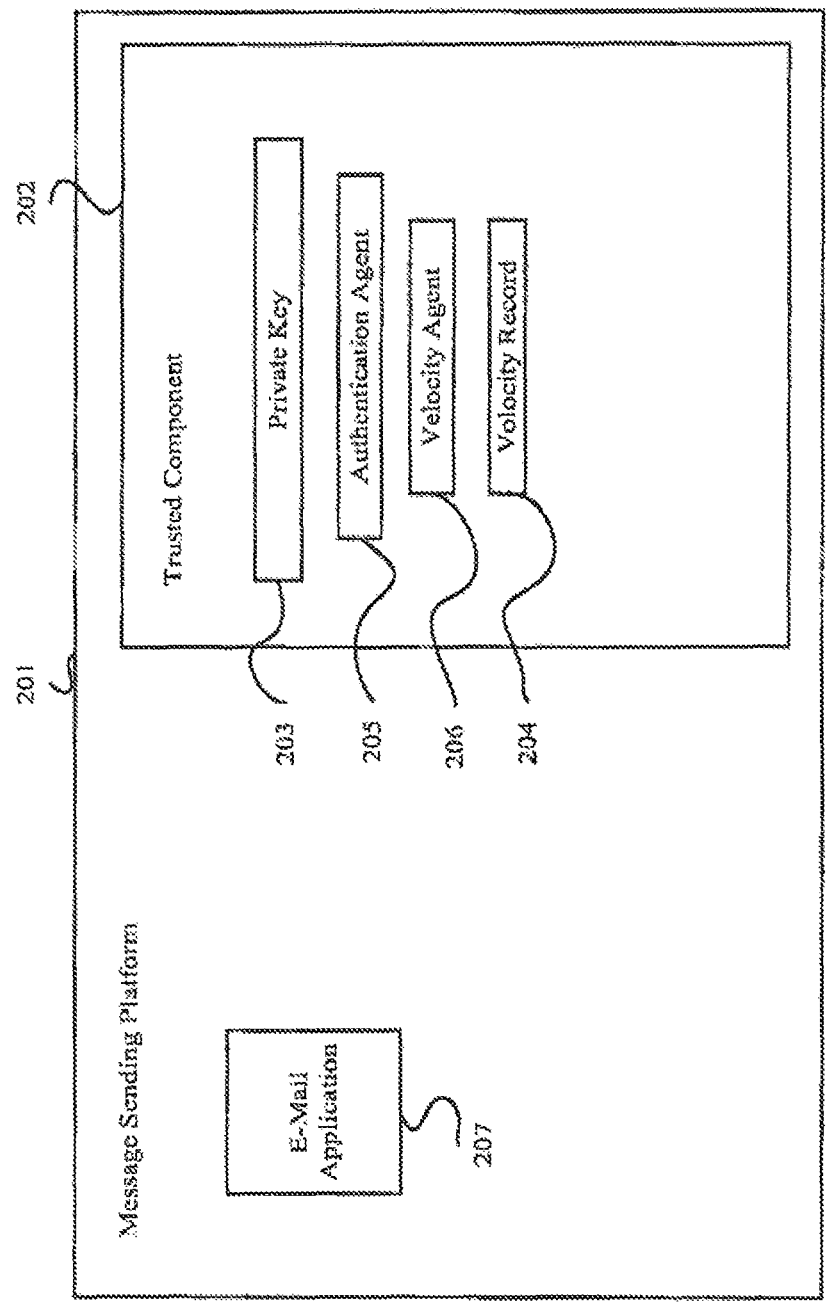
FIG. 2 is a message sending platform in accordance with an embodiment of the present invention.

An embodiment of the present invention is shown in FIG. 2. A message sending platform 201 has a Trusted Component 202 that can be comprised of tamper resistant software and/or hardware. The trusted hardware can include a trusted processor and/or trusted memory. The trusted component can store a private key 203 and a velocity record 204 that stores information about the number of messages sent over a period of time. The trusted component can include an authentication agent 205 and a velocity agent 206, which can develop content that can be associated with a message to be sent using a messaging application 207. The messaging application 207 can be untrusted. For example, an untrusted messaging application 207 can send message parameters (e.g., message body, subject line, address, etc.) to the trusted component 202 to be hashed and signed by the authentication agent 205 using the private key 203. The velocity agent 206 can calculate and provide a velocity indicator for the message, and store recent velocity information in the velocity record 204. The velocity indicator can be attached to or associated with the message in a trusted, tamper-resistant fashion. An associated indicator can be sent with the message, or separately from the message.

A referee can be used to verify messages sent in bulk, e.g., with free e-mail services such as those provided by Hotmail and Yahoo! Messages sent from such a service can include a velocity indicator that is authenticated with, e.g., a MAC. The MAC can be used to verify the whole message, or, in the case of bulk messaging services, to verify only a limited number of message headers, e.g., just enough to ensure that a party could not simply take a message header and velocity record and abstract it. This can advantageously reduce what would otherwise be a massive processing overhead on the bulk message service. The MAC can be verified by callback to the sender of the message. The callback can include the MAC and its key, and the sender of the message can be asked to verify that it created the MAC. The callback messages can be authenticated using a signature that need only be created for users of the callback service, thereby saving processor and network resources. The callback messages can also be verified using a shared secret between the receiver of the message and the callback authentication service. In one embodiment, the sender of the message can create the MAC, and a third party service provider to which the user can connect can verify the MAC. The present invention can be applied to any form of messaging where an unsolicited message can be sent. It can also apply to other situations where a commonly shared resource can be degraded because little or no cost for doing so is applied to one or more of its users. For example, a party that has a fixed capacity network connection to a site can permit other parties to make use of unused network capacity, e.g., through a wireless link such as 802.11b, provided that such usage is reasonable and does not negatively impact the offering party's usage. In accordance with an embodiment of the present invention, a velocity indicator can be incorporated into the protocol used to connect by a trusted component at the connecting user. The velocity indicator can show how often the given user has taken advantage of the unused bandwidth, how much traffic the user sent over unused bandwidth, etc. Access to users seeking to use unused bandwidth can be limited based upon their past behavior.

Similarly, network usage rates can be charged based upon velocity indicators. For example, network usage cost can be based upon the rate at which the network is used. The usage velocity indicator can be used to set the amount a user is charged for network usage, based upon the rate at which that user has recently used the network. Velocity record information can be exchanged using a suitable protocol, such as SIP, for applications such as telephony and voice over IP. The velocity record can be formed as an independent signed block inside the message signature or as an attribute of the message signature.

The present invention can be implemented on one or more computers, each of which includes a processor coupled to a memory. The processor can be a general purpose processor, such as the Pentium IV processor manufactured by the Intel Corporation of Santa Clara, Calif.; an Application Specific Integrated Circuit ("ASIC") that embodies at least part of the method in accordance with an embodiment of the present invention in hardware and/or firmware; or a combination thereof. Memory stores instructions adapted to be executed by the processor to perform the method in accordance with an embodiment of the present invention. If implemented on more than one computer, the computers can be coupled by a network, such as Local Area Network (LAN), a Wide Area Network (WAN), the Internet, etc.

What is claimed is:

1. A computer-implemented method comprising:
creating, by a processor, a velocity record for a message that indicates a rate at which digital signatures are created at a time when the velocity record is created; and
sending the velocity record to a recipient.

2. The computer-implemented method according to claim 1, further comprising:
invoking a trusted component of a message sending platform; and
determining the rate at which the digital signatures are created, wherein the velocity record is created by digitally signing the message with a private key stored in a memory associated with the trusted component.

3. The computer-implemented method according to claim 1, wherein the velocity record comprises an indication of a limit of a number of digital signatures that can be created for a sender for a period of time.

4. The computer-implemented method according to claim 3, wherein the velocity record comprises another indication of another limit of the number of digital signatures that can be created for the sender for another period of time.

5. The computer-implemented method according to claim 1, wherein the velocity record comprises a parameter that indicates a rate at which messages are sent by a sender.

6. The computer-implemented method according to claim 5, wherein the parameter comprises an adjustable time decay parameter that is adjustable to change a sensitivity of the parameter to the rate at which messages are being sent.

7. The computer-implemented method according to claim 6, wherein the parameter is expressed as $c+e^{-(p/t'-t)}$ where c is a last recorded count, t' is a current time, t'−t is a time interval between sending of successive messages, and p is the adjustable time decay parameter.

8. The computer-implemented method according to claim 1, wherein the velocity record is associated with a message authentication code that is used for authentication.

9. The computer-implemented method according to claim 1, wherein the velocity record is sent with the message.

10. The computer-implemented method according to claim 1, wherein the velocity record is sent separately from the message.

11. The computer-implemented method according to claim 1, wherein the message is a telephone message and the velocity record is communicated to the receipt using a telephony or voice over Internet Protocol (IP).

12. The computer-implemented method according to claim 11, wherein the velocity record is formed as an independent signed block inside a message signature or as an attribute of the message signature.

13. A device comprising:
one or more processors; and
at least one memory storing instructions that, when executed by the one or more processors, perform a method comprising:
creating a velocity record for a message that indicates a rate at which digital signatures are created at a time when the velocity record is created; and
sending the velocity record to a recipient.

14. The device method according to claim 13, wherein the one or more processors further perform the method comprising:
invoking a trusted component of a message sending platform; and
determining the rate at which the digital signatures are created, wherein the velocity record is created by digitally signing the message with a private key stored in a memory associated with the trusted component.

15. The device according to claim 13, wherein the velocity record comprises an indication of a limit of a number of digital signatures that can be created for a sender for a period of time.

16. The device according to claim 15, wherein the velocity record comprises another indication of another limit of the number of digital signatures that can be created for the sender for another period of time.

17. The device according to claim 13, wherein the velocity record comprises a parameter that indicates a rate at which messages are sent by a sender.

18. The device according to claim 17, wherein the parameter comprises an adjustable time decay parameter that is adjustable to change a sensitivity of the parameter to the rate at which messages are being sent.

19. The device according to claim 18, wherein the parameter is expressed as $c+e^{-(p/t'-t)}$ where c is a last recorded count, t' is a current time, t'−t is a time interval between sending of successive messages, and p is the adjustable time decay parameter.

20. The device according to claim 13, wherein the velocity record is associated with a message authentication code that is used for authentication.

21. The device according to claim 13, wherein the velocity record is sent with the message.

22. The device according to claim 13, wherein the velocity record is sent separately from the message.

23. The device according to claim 13, wherein the message is a telephone message and the velocity record is communicated to the receipt using a telephony or voice over Internet Protocol (IP).

24. The device according to claim 23, wherein the velocity record is formed as an independent signed block inside a message signature or as an attribute of the message signature.

25. A non-transitory computer-readable storage medium containing instructions which, when executed on a processor, perform a method comprising:
   creating, by a processor, a velocity record for a message that indicates a rate at which digital signatures are created at a time when the velocity record is created; and
   sending the velocity record to a recipient.

26. The non-transitory computer-readable storage medium according to claim 25, further comprising:
   invoking a trusted component of a message sending platform; and
   determining the rate at which the digital signatures are created, wherein the velocity record is created by digitally signing the message with a private key stored in a memory associated with the trusted component.

27. The non-transitory computer-readable storage medium according to claim 25, wherein the velocity record comprises an indication of a limit of a number of digital signatures that can be created for a sender for a period of time.

28. The non-transitory computer-readable storage medium according to claim 27, wherein the velocity record comprises another indication of another limit of the number of digital signatures that can be created for the sender for another period of time.

29. The non-transitory computer-readable storage medium according to claim 25, wherein the velocity record comprises a parameter that indicates a rate at which messages are sent by a sender.

30. The non-transitory computer-readable storage medium according to claim 29, wherein the parameter comprises an adjustable time decay parameter that is adjustable to change a sensitivity of the parameter to the rate at which messages are being sent.

31. The non-transitory computer-readable storage medium according to claim 30, wherein the parameter is expressed as $c+e^{-(p/t'-t)}$ where c is a last recorded count, t' is a current time, t'−t is a time interval between sending of successive messages, and p is the adjustable time decay parameter.

32. The non-transitory computer-readable storage medium according to claim 25, wherein the velocity record is associated with a message authentication code that is used for authentication.

33. The non-transitory computer-readable storage medium according to claim 25, wherein the velocity record is sent with the message.

34. The non-transitory computer-readable storage medium according to claim 25, wherein the velocity record is sent separately from the message.

35. The non-transitory computer-readable storage medium according to claim 25, wherein the message is a telephone message and the velocity record is communicated to the receipt using a telephony or voice over Internet Protocol (IP).

36. The non-transitory computer-readable storage medium according to claim 35, wherein the velocity record is formed as an independent signed block inside a message signature or as an attribute of the message signature.

\* \* \* \* \*